(No Model.)
I. T. WILLIAMS.
DRAFT EQUALIZER.
No. 493,323. Patented Mar. 14, 1893.
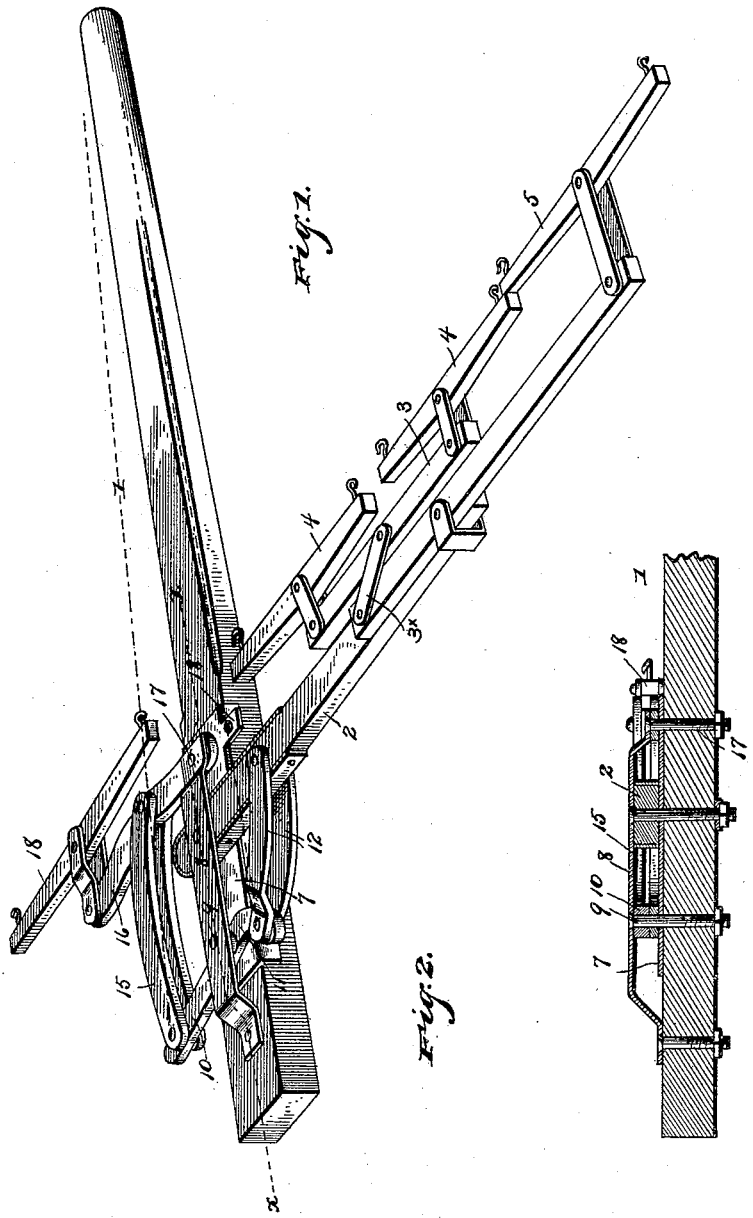
Witnesses
B. S. Ober
Chas. S. Hyer
Inventor
Isaac T. Williams,
By his Attorneys,
C. A. Snow & Co.

UNITED STATES PATENT OFFICE.

ISAAC T. WILLIAMS, OF CLEARMONT, MISSOURI.

DRAFT-EQUALIZER.

SPECIFICATION forming part of Letters Patent No. 493,323, dated March 14, 1893.

Application filed November 14, 1892. Serial No. 451,978. (No model.)

*To all whom it may concern:*

Be it known that I, ISAAC T. WILLIAMS, a citizen of the United States, residing at Clearmont, in the county of Nodaway and State of Missouri, have invented a new and useful Draft-Equalizer, of which the following is a specification.

This invention relates to draft-equalizers, and consists in the construction and arrangement of the parts as will be more fully hereinafter described and claimed.

The object of this invention is to provide a device of the character set forth having a positive action and a simplified construction, and wherein one horse is placed on one side of the tongue or center of draft and the greater number on the opposite side thereof to thereby avoid having one horse walk in the grain or on ground already broken by the plow, and also to make the draft equal to each of the horses attached to the device whatever their positions may be.

In the drawings:—Figure 1 is a perspective view of the equalizer embodying the invention. Fig. 2 is a section on the line *x—x*, Fig. 1.

Similar numerals of reference are employed to designate corresponding parts in both figures of the drawings.

Referring to the drawings, the numeral 1 designates the draft-beam of a harvesting machine, sulky-plow, or other analogous device, to which is pivotally connected one end of a transverse equalizing-beam 2, that projects wholly from one side of the draft-beam; and to said equalizing-beam at the outer end thereof is pivotally connected a supplemental equalizing-beam 3, that is held in connection by a clip 3×. The supplemental beam 3 is attached to the beam 2 at one side of the center thereof, and to the inner side or end of the said supplemental beam 3 is movably connected the singletree 4, and to the outer end thereof the doubletree 5, said attachment of the single and double tree being made by links 6. It will be understood that the singletree and doubletree may be reversed from the positions shown if so desired. The inner end of the transverse equalizing-beam 2 bears upon a metallic plate 7, secured to the top of the draft-beam 1, and over the end of the said equalizing-beam extends a metallic clip 8 that is arranged in the same longitudinal direction as the said draft-beam and forms an upper bearing for the several connecting-bolts or pivots of the device, and holds the same in position. The metallic plate on top of the tongue prevents splitting of the tongue in addition to providing a strong bearing surface for the movement of the several parts thereover. At the rear of the tongue, and rising vertically therefrom, and extending therethrough and through the clip 8, is a pivot-bolt 9, forming a bearing for a lever 10, through which it also passes, the said lever 10 having a collar integrally formed therewith around the opening through which the said bolt 9 passes to hold the said lever against vertical movement and thereby obviate a too loose attachment. The one end of the said lever 10 is extended rearward, as at 11, and formed with an opening therein, and to opposite sides thereof are pivotally connected the rear ends of forwardly-projecting curved arms 12, whose forward ends embrace the upper and lower sides of the equalizing-beam 2, and are pivotally connected to said beams.

Attached to the bolt 13 that forms the pivot for the front ends of the arms 12, is a brace 14, that is secured to the under side of the pole or draft-beam and thereby assists in holding the said equalizing-beam 2 in proper position. The opposite end of the lever 10 from that to which the arms 12 are attached projects a greater distance laterally beyond the draft-beam, and thereto are pivotally connected the rear ends of elongated segmental arms that embrace the upper and lower sides thereof and extend forward and are connected to a point in advance of the equalizing-beam 2. The said segmental arms 15 are spaced apart and have their front ends connected to a lever 16, that is secured at its inner end to a pivot-bolt 17, that also constitutes the mode of fastening the front end of the clip 8 and is supplied with a nut so that it can be removed. To the outer end of the said lever 16 is secured a singletree 18, and it will be observed that the draft on opposite sides of the draft-beam 1 is equalized by the arrangement of the singletrees and doubletrees as set forth, together with the connecting-arms 12 and 15, and the levers 10 and 16. One side of the plate at the forward end is formed with a lug 18, and by removing bolt 17 from the position shown, and the end of the lever 16 over to the lug 18 and securing said end of the lever to the lug, the side-draft prevalent in all harvesting machines is removed and avoided; but for ordinary work the position shown in the accompanying drawings is that which will be used.

When the animals or horses are secured to the doubletree and to the singletrees, the horse attached to the singletree on the one side of the draft-beam or pole will only be caused to draw his equal share against the three animals on the reverse side of the beam, as the leverage, set up by the parts 2, 12, 10, 15, and 16 will equalize the draft and the lever 10, arranged and connected as heretofore set forth, virtually forms a bell-crank lever and with the lever 16 a compound leverage is established, which as will be understood is powerful and strong. The lines of draft will be exerted in the dotted lines indicated in Fig. 1, which show that said draft is all directly concentrated toward a central line of the draft beam or pole.

Changes in the form, proportion, and the minor details of construction may be resorted to without departing from the principle or sacrificing any of the advantages of this invention.

Having described the invention, what is claimed as new is—

In a draft-equalizer, the combination of a draft-beam, an equalizing-beam pivoted thereto and projected from one side only thereof, a supplemental beam secured to the said equalizing-beam near the outer end of the latter, a singletree and doubletree carried by said supplemental beam, a lever pivoted to the draft-beam in rear of said equalizing-beam and projecting at a greater distance from one side than the other, a pair of arms pivotally attached to the shorter projecting side of said lever and embracing said equalizing-beam, a pair of segmental arms pivotally connected to the opposite projecting ends of the said lever, a lever pivotally secured to the front ends of said segmental arms, said latter lever of itself being pivotally connected to the draft-beam, a singletree attached to the outer end of said last-named lever, a metal plate applied to the top portion of the draft-beam and having a lug projecting from one side of the same near the front end, and a metallic clip extending over said parts and arranged in longitudinal alignment with the draft-beam, substantially as described.

In testimony that I claim the foregoing as my own I have hereto affixed my signature in the presence of two witnesses.

ISAAC T. WILLIAMS.

Witnesses:
B. L. MOORE,
J. H. FRYMIRE.